United States Patent
Hamada

(10) Patent No.: US 11,514,192 B2
(45) Date of Patent: Nov. 29, 2022

(54) SECURE READING APPARATUS, SECURE WRITING APPARATUS, METHOD THEREOF, AND PROGRAM FOR READING AND WRITING DATA IN A SEQUENCE WITHOUT REVEALING AN ACCESS POSITION

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 120 days.

(21) Appl. No.: 16/648,436

(22) PCT Filed: Sep. 11, 2018

(86) PCT No.: PCT/JP2018/033595
§ 371 (c)(1),
(2) Date: Mar. 18, 2020

(87) PCT Pub. No.: WO2019/059042
PCT Pub. Date: Mar. 28, 2019

(65) Prior Publication Data
US 2020/0218833 A1 Jul. 9, 2020

(30) Foreign Application Priority Data

Sep. 21, 2017 (JP) .............................. JP2017-181262
Sep. 21, 2017 (JP) .............................. JP2017-181263

(51) Int. Cl.
*G06F 21/00* (2013.01)
*G06F 21/72* (2013.01)
*G09C 1/00* (2006.01)

(52) U.S. Cl.
CPC .............. *G06F 21/72* (2013.01); *G09C 1/00* (2013.01)

(58) Field of Classification Search
CPC .... G06F 21/72; G06F 21/71; G09C 1/00; H04L 2209/46
See application file for complete search history.

(56) References Cited

U.S. PATENT DOCUMENTS

2014/0007250 A1* 1/2014 Stefanov ............. G06F 21/6254
726/26
2017/0212679 A1* 7/2017 Pass ...................... G06F 13/387

FOREIGN PATENT DOCUMENTS

WO WO-2016019294 A1 * 2/2016 ........... G06F 12/084

OTHER PUBLICATIONS

International Search Report dated Dec. 11, 2018 in PCT/JP2018/033595 filed Sep. 11, 2018.
(Continued)

*Primary Examiner* — Jeffrey C Pwu
*Assistant Examiner* — Helai Salehi
(74) *Attorney, Agent, or Firm* — Oblon, McClelland, Maier & Neustadt, L.L.P.

(57) ABSTRACT

Data is efficiently read from a sequence without a read position being revealed. A secure reading apparatus 1 receives a secret text sequence and a secret text of a read position as input, and outputs an element at the read position of the secret text sequence. A vector creating part (12) creates a vector expressing the read position. A compression computing part (13) repeatedly generates a new secret text sequence in which an inner product of a vector based on the secret text sequence and a vector expressing the read position is set as an element. The reading part (14) outputs the
(Continued)

new secret text sequence having the number of elements of one as the element at the read position of the secret text sequence.

13 Claims, 4 Drawing Sheets

(56) References Cited

OTHER PUBLICATIONS

Chida et al., A Three-Party Secure Function Evaluation with Lightweight Verifiability Revisited:, CSS, 2010, (6 total pages).

Keller et al., "Efficient, Oblivious Data Structures for MPC", Advances in Cryptology—ASIACRYPT 2014, vol. 8874 of Lecture Notes in Computer Science, pp. 506-525, 2014.

Hamada Koki, et al., "Round-Efficient Pattern Matching for Secure Computation," CSS2014 Computer Security Symposium 2014 Ronbunshu, vol. 2014, No. 2, XP003032484, Oct. 15, 2014, 26 pages.

Peeter Laud, "A Private Lookup Protocol with Low Online Complexity for Secure Multiparty Computation," Advances in Databases and Information Systems, LNCS 8958, XP047518095, 2015, pp. 143-157.

* cited by examiner

SECURE READING APPARATUS, SECURE WRITING APPARATUS, METHOD THEREOF, AND PROGRAM FOR READING AND WRITING DATA IN A SEQUENCE WITHOUT REVEALING AN ACCESS POSITION

TECHNICAL FIELD

The present invention relates to a cryptography application technology, and, particularly, to a technique of reading data from and writing data in a sequence without revealing an access position.

BACKGROUND ART

As a method for obtaining a particular computation result without reconstructing an encrypted numerical value, there is a method called secure computation (see, for example, Non-patent literature 1). With the method disclosed in Non-patent literature 1, by encryption being performed so that fragments of numerical values are distributed to three secure computation apparatuses, and the three secure computation apparatuses performing cooperative computation, it is possible to maintain a state where results of addition and subtraction, constant addition, multiplication, constant multiplication, logical operation (NOT, AND, OR, EXCLUSIVE-OR) and data format conversion (integer, binary) are distributed to the three secure computation apparatuses, that is, encrypted without the numerical values being reconstructed.

In a case where the i-th data is read from a sequence without a read position i being revealed, commonly the i-th data is obtained by determining whether or not a position matches the read position i for all elements, and, in a case where the position does not match the read position i, replacing a value of the position with 0, and adding up values of all the elements (see, for example, Non-patent literature 2).

In a case where a value d is written in the i-th data of a sequence without a write position i being revealed, commonly, a new sequence having the same size as a size n of the sequence is prepared, d is set only for the i-th element, 0 is set for other elements, and the new sequence is added to a sequence of a write destination (see, for example, Non-patent literature 2).

PRIOR ART LITERATURE

Non-Patent Literature

Non-patent literature 1: Koji Chida, Koki Hamada, Dai Ikarashi, Katsumi Takahashi, "Reconsideration of Lightweight Verifiable Three-party Secure Function Evaluation", CSS, 2010
Non-patent literature 2: Marcel Keller and Peter Scholl, "Efficient, oblivious data structures for MPC", Advances in Cryptology—ASIACRYPT 2014, Vol. 8874 of Lecture Notes in Computer Science, pp. 506-525, 2014.

SUMMARY OF THE INVENTION

Problems to be Solved by the Invention

However, in related art disclosed in Non-patent literature 2, in a case where data is read from a sequence having a size n through constant-depth multiplication, it has been necessary to perform multiplication the number of times proportional to n. Further, in related art disclosed in Non-patent literature 2, a communication amount $\Omega(nm)$ has been required to write in values in a sequence having the size n through constant-depth communication.

In view of the above-described points, it is an object of the present invention to enable efficient reading of data from a sequence without a read position being revealed with a smaller number of times than that in related art through constant-depth multiplication. Further, it is another object of the present invention to enable efficient writing of data in a sequence without a write position being revealed with a smaller communication amount than that in related art through constant-depth communication.

Means to Solve the Problems

To solve the above-described problems, a secure reading apparatus according to a first aspect of the present invention is a secure reading apparatus which receives a secret text sequence and a secret text of a read position as input, and outputs an element at the read position of the secret text sequence, in which generation of a new secret text sequence in which an inner product of a vector expressing the read position and a vector based on the secret text sequence is set as an element is repeated until a number of elements of the new secret text sequence becomes one, and the new secret text sequence having the number of elements of one is output as the element at the read position.

To solve the above-described problems, a secure writing apparatus according to a second aspect of the present invention is a secure writing apparatus which receives a secret text sequence, a secret text of a write address, and a secret text of a value to be written as input, and adds the value to an element at the write address of the secret text sequence, in which an inner product of a vector expressing the write address and a vector expressing the value to be written is added to the secret text sequence.

Effects of the Invention

According to the secure reading technique in the first aspect of the present invention, it is possible to efficiently read data from a sequence without revealing a read position with a smaller number of times than that in related art through constant-depth multiplication. According to the secure writing technique in the second aspect of the present invention, it is possible to efficiently write data in a sequence without revealing a write position with a smaller communication amount than that in related art through constant-depth communication.

DETAILED DESCRIPTION OF THE EMBODIMENTS

Figure 1:
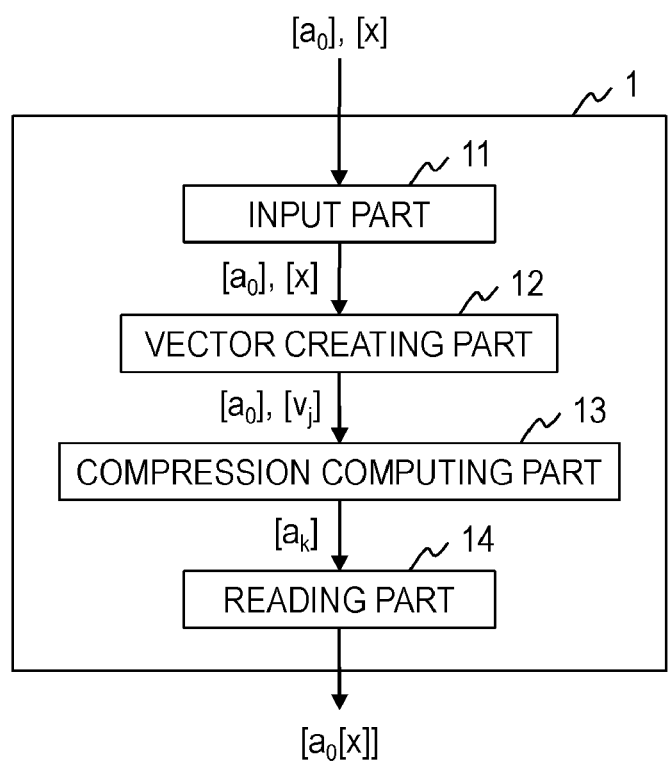
FIG. 1 is a diagram illustrating a functional configuration of a secure reading apparatus.

Prior to the description of embodiments, a notation method and definition of terms in this specification will be described.

<Notation Method>

A value obtained by concealing a certain value "a" through encryption, secret sharing, or the like, will be referred to as a secret text of "a", and expressed as [a]. Further, "a" is referred to as a plain text of [a]. In a case where concealment is performed through secret sharing, an aggregate of fragments of secret sharing, possessed by respective secure computation apparatuses is referred to by [a]. The i-th element of a vector $a=(a_0, a_1, \ldots)$ is referred to by $a[i]$. The number of elements of the vector a is expressed as $|a|$.

$\lfloor x \rfloor$ is a floor function, and indicates a maximum integer equal to or less than a real number x.

$\lceil x \rceil$ is a ceiling function and indicates a minimum integer equal to or greater than the real number x.

<Addition, Subtraction, Multiplication>

In each operation of addition, subtraction and multiplication to be performed on a secret text, secret texts [a] and [b] of two values a and b are input, and secret texts $[c_1]$, $[c_2]$ and $[c_3]$ of $c_1$, $c_2$ and $c_3$ which are respectively computation results of a+b, a−b and ab are computed. Execution of these kinds of operation will be expressed as in the following expressions.

$[c_1] \leftarrow \text{Add}([a],[b])$, $[c_2] \leftarrow \text{Sub}([a],[b])$, $[c_3] \leftarrow \text{Mul}([a],[b])$ In a case where there is no possibility that misunderstanding is caused, Add([a], [b]), Sub([a], [b]), and Mul([a], [b]) will be respectively abbreviated as [a]+[b], [a]−[b] and [a][b].

<Equality Testing>

Processing in which the secret texts [a] and [b] of two values a and b are input, and a secret text [c] in which, if a=b, c=1, and, if a≠b, c=0, is computed will be expressed as in the following expression.

$[c] \leftarrow ([a] \stackrel{?}{=} [b])$

Embodiments of the present invention will be described in detail below. Note that, in the drawings, the same reference numerals will be assigned to component parts having the same functions, and redundant description will be omitted.

First Embodiment

A secure reading apparatus according to a first embodiment receives a secret text sequence and a secret text of a read position as input, and outputs an element at the read position of the secret text sequence. At this time, generation of a new secret text sequence in which an inner product of a vector expressing the read position and a vector based on the secret text sequence is set as an element is repeated until the number of elements of the new secret text sequence becomes one, and the new secret text sequence having the number of elements of one is output as the element at the read position.

As illustrated in FIG. 1, a secure reading apparatus 1 in the first embodiment includes an input part 11, a vector creating part 12, a compression computing part 13 and a reading part 14. By this secure reading apparatus 1 performing processing in each step illustrated in FIG. 2, a secure reading method in the first embodiment is implemented.

The secure reading apparatus 1 is a special apparatus configured by, for example, a special program being read into a publicly-known or dedicated computer having a central processing unit (CPU), a random access memory (RAM), or the like. The secure reading apparatus 1, for example, executes various kinds of processing under control of the CPU. Data input to the secure reading apparatus 1 and data obtained through respective kinds of processing are, for example, stored in the RAM, and the data stored in the RAM is read out to the CPU as necessary and is utilized for other processing. At least part of respective processing parts of the secure reading apparatus 1 may be configured with hardware such as an integrated circuit.

Figure 2:
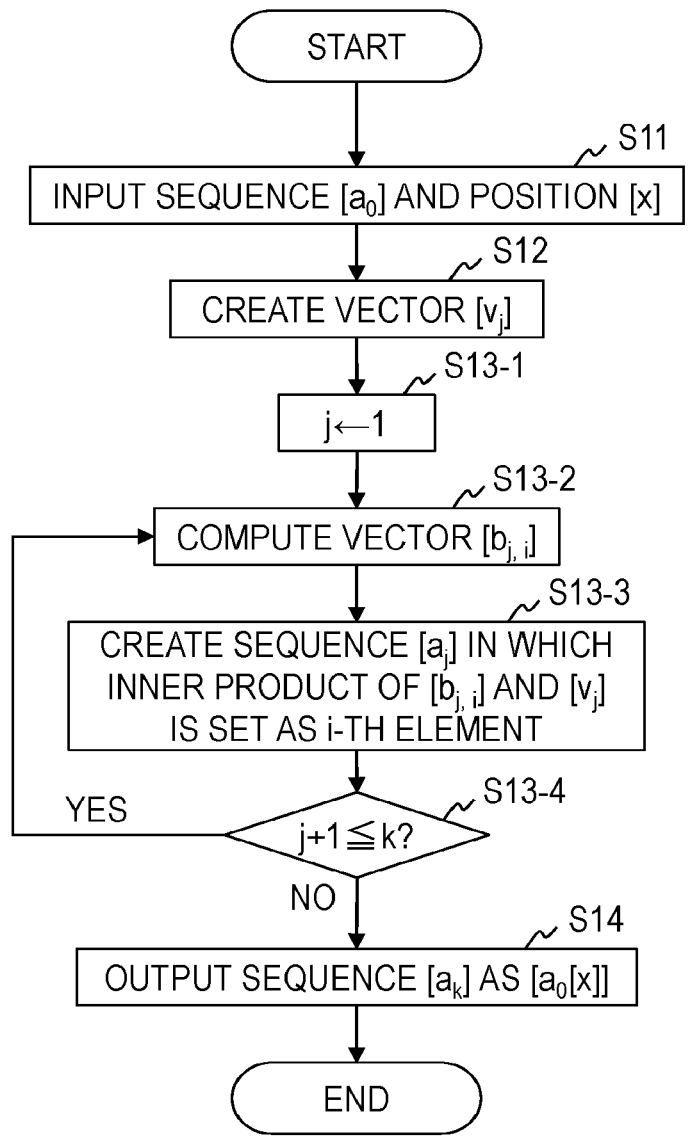
FIG. 2 is a diagram illustrating processing procedure of a secure reading method.

A secure reading method to be executed by the secure reading apparatus 1 in the first embodiment will be described below with reference to FIG. 2.

In step S11, the input part 11 receives a secret text sequence $[a_0]=([a_0[0]], [a_0[1]], \ldots, [a_0[n-1]])$ having a size n, and a secret text [x] of a read position x as input. The input part 11 outputs the secret text sequence $[a_0]$ and the secret text [x] to the vector creating part 12.

In step S12, the vector creating part 12 receives the secret text sequence $[a_0]$ and the secret text [x] from the input part 11, and creates a vector $[v_j]$ of k secret texts. However, k is an integer equal to or greater than 2, and j is each integer equal to or greater than 1 and equal to or less than k. Specifically, the secret text vector $[v_j]$ having a size $m_j$ in which $m_1, m_2, \ldots, m_k$ are set as natural numbers satisfying $n \leq m_1 \times m_2 \times \ldots \times m_k$, and $x_j$ is set as an integer defined in the formula (1) for each integer j, and the $(x_j \bmod m_j)$-th element is one, and other elements are zero, is created.

$$x_j = \left\lfloor \frac{x}{m_1 \times m_2 \times \ldots \times m_{j-1}} \right\rfloor \quad (1)$$

Particularly, if each input secret text is a share obtained through (t, s) Shamir secret sharing, k, $m_i$ (i=1, 2, ..., k) can be set as in formula (2). Note that (t, s) Shamir secret sharing is secret sharing in which distributed values obtained by dividing an input plain text into s pieces are stored in s secure computation apparatuses, and if arbitrary t shares are collected, the plain text can be reconstructed, while any information regarding the plain text cannot be obtained from less than t shares. At this time, t is an integer equal to or greater than 1, and $s \geq 2t-1$.

$$k = \left\lfloor \frac{s-1}{t-1} \right\rfloor, m_i = \lceil n^{1/k} \rceil \quad (2)$$

In step S13-1, the compression computing part 13 initializes j to 1.

In step S13-2, the compression computing part 13 creates a vector of $n_j$ secret texts $[b_{j,i}]$ using a secret text sequence $[a_{j-1}]$. The number $n_j$ of the secret text vector $[b_{j,i}]$ to be created differs depending on a value of j. Specifically, the secret text vector $[b_{j,j}]$ is computed assuming that $n_j$ is an integer defined in formula (3), i is set as each integer equal to or greater than 0 and less than $n_j$, and $[b_{j,i}]=([a_{j-1}[m_j i+0]], [a_{j-1}[m_j i+1]], \ldots, [a_{j-1}[m_j i+m_j-1]])$ (where, if $\lambda \geq |a_{j-1}|$, $[a_{j-1}[\lambda]]=0$).

$$n_j = \left\lceil \frac{n}{m_1 \times m_2 \times \ldots \times m_j} \right\rceil \quad (3)$$

In step S13-3, the compression computing part 13 computes a secret text sequence $[a_j]$ in which an inner product of the secret text vector $[b_{j,i}]$ and the secret text vector $[v_j]$ is set as the i-th element.

In step S13-4, the compression computing part 13 determines if $j+1$ is equal to or less than k ($j+1 \le k$), and, if $j+1$ is equal to or less than k, increments j ($j \leftarrow j+1$), and returns the processing to step S13-2, and, if $j+1$ is greater than k ($j+1 > k$), outputs a secret text sequence $[a_k]$. Note that, at this time, the secret text sequence $[a_k]$ is a sequence having the number of elements of one.

In step S14, the reading part 14 outputs the secret text sequence $[a_k]$ having the number of elements of one as a secret text $[a_0[x]]$ which is the x-th element in a secret text sequence $[a_0]$.

The first embodiment has a feature that reading of the i-th element is expressed with a k-depth inner product using a vector having a size $\Theta(n^{1/k})$ by utilizing characteristics that it is possible to perform up to k-1-depth multiplication (inner product) through communication corresponding to multiplication of one time in (t, s) Shamir secret sharing. As a result of a size of each vector being set as $O(n^{1/k})$, so that k-1-depth computation can be completed with $O(n^{1/k})$ times, it is possible to suppress an overall communication amount to $O(n^{1/k})$.

Second Embodiment

A secure writing apparatus in a second embodiment receives a secret text sequence, a secret text of a write address, and a secret text of a value to be written as input, and adds the value to an element at the write address of the secret text sequence. At this time, an inner product of a vector expressing the write address and a vector expressing the value to be written is added to the secret text sequence.

Figure 3:
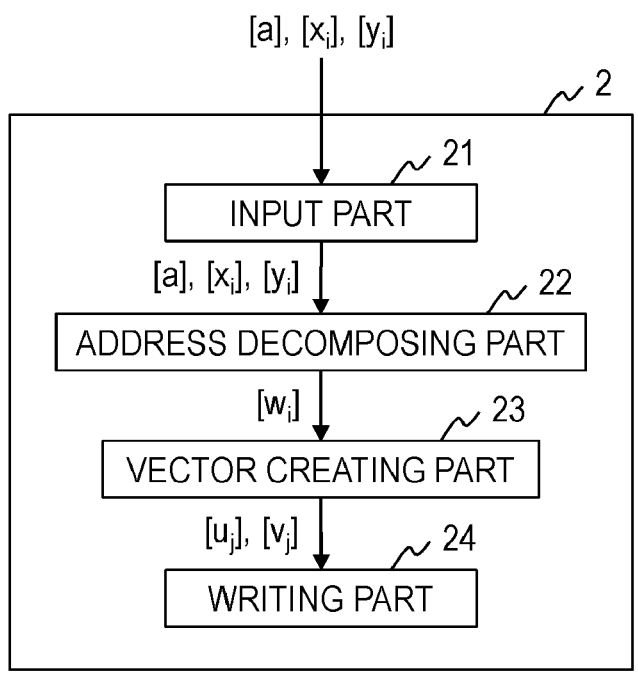
FIG. 3 is a diagram illustrating a functional configuration of a secure writing apparatus.

As illustrated in FIG. 3, a secure writing apparatus 2 in the second embodiment includes an input part 21, an address decomposing part 22, a vector creating part 23 and a writing part 24. By this secure writing apparatus 2 performing processing in each step illustrated in FIG. 4, a secure writing method in the second embodiment is implemented.

The secure writing apparatus 2 is a special apparatus configured by, for example, a special program being read into a publicly-known or dedicated computer having a central processing unit (CPU), a random access memory (RAM), or the like. The secure writing apparatus 2, for example, executes various kinds of processing under control of the CPU. Data input to the secure writing apparatus 2 and data obtained through respective kinds of processing are, for example, stored in the RAM, and the data stored in the RAM is read out to the CPU as necessary and is utilized for other processing. At least part of respective processing parts of the secure writing apparatus 2 may be configured with hardware such as an integrated circuit.

Figure 4:
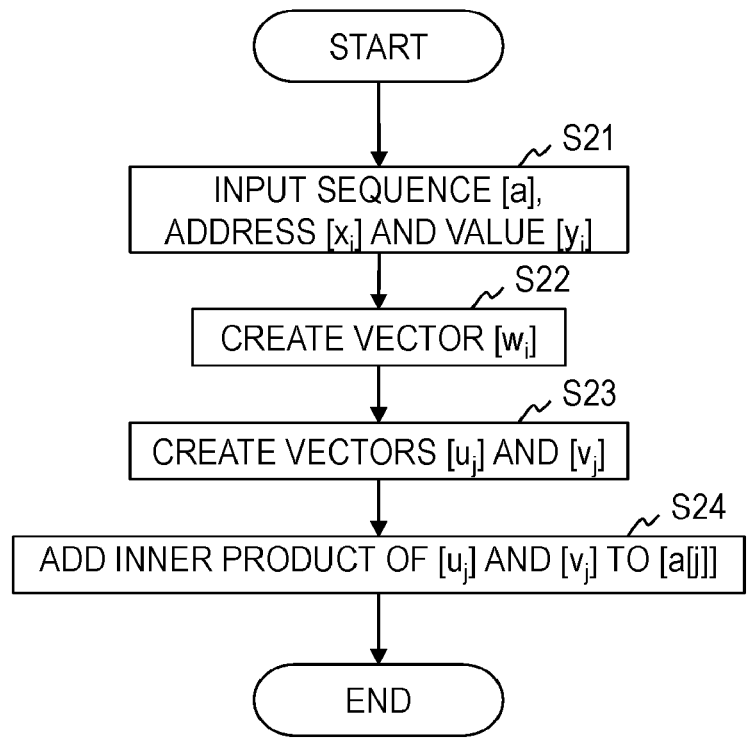
FIG. 4 is a diagram illustrating processing procedure of a secure writing method.

A secure writing method to be executed by the secure writing apparatus 2 in the second embodiment will be described below with reference to FIG. 4.

In step S21, the input part 21 receives a secret text sequence $[a]=([a[0]], [a[1]], \ldots, [a[n-1]])$ having a size n, a secret text $[x_i]$ of m write addresses and a secret text $[y_i]$ of m values to be written as input. However, in is an integer equal to or greater than 2, and i is each integer equal to or greater than 0 and less than in. The input part 21 outputs the secret text $[x_i]$ of the write addresses and the secret text $[y_i]$ of the values to be written to the address decomposing part 22.

In step S22, the address decomposing part 22 receives the secret text $[x_i]$ of the write addresses and the secret text $[y_i]$ of the values to be written from the input part 21, and creates a secret text vector $[w_i]$ which expresses writing of each value $y_i$ of the write address $x_i$. Specifically, secret text vectors $[p_i]$, $[q_i]$ in which $n_1$ and $n_2$ are set as natural numbers satisfying $n_1 n_2 \ge n$, $p_i[\lambda_1]q_i[\lambda_2]$ becomes $[y_i]$ when $n_2\lambda_1+\lambda_2=x_i$, otherwise, becomes 0, are created, and the secret text vectors $[p_i]$, $[q_i]$ are concatenated to generate a secret text vector $[w_i]=[p_i]\|[q_i]$. At this time, the secret text vector $[p_i]$ may be a secret text vector having a size $n_1$ in which an element of $[p_i[\lfloor x_i/n_2 \rfloor]]$ is one, and other elements are zero, and the secret text vector $[q_i]$ may be a secret text vector having a size $n_2$ in which an element of $[q_i[x_i \bmod n_2]]$ is $[y_i]$, and other elements are zero.

Particularly, if each input secret text is a share obtained through (t, s) Shamir secret sharing, $n_1$ and $n_2$ can be set as in formula (4). Note that (t, s) Shamir secret sharing is secret sharing in which distributed values obtained by dividing an input plain text into s pieces are stored in s secure computation apparatuses, and, if arbitrary t shares are collected, the plain text can be reconstructed, while any information regarding the plain text cannot be obtained from less than t shares. At this time, t is an integer equal to or greater than 1, and $s \ge 2t-1$.

$$n_1, n_2 = \lceil \sqrt{n} \rceil \quad (4)$$

In step S23, the vector creating part 23 selects an element from the secret text vector $[w_i]$ and generates secret text vectors $[u_j]$ and $[v_j]$ while j is set as each integer equal to or greater than 0 and less than n. Specifically, $\lambda_1$ and $\lambda_2$, are expressed as in formula (5) while i is set as each integer equal to or greater than 0 and less than in, and j is set as each integer equal to or greater than 0 and less than n.

$\lambda_1 = \lfloor j/n_2 \rfloor$, $\lambda_2 = j \bmod n_2 \quad (5)$

The secret text vectors $[u_j]$ and $[v_j]$ are generated as in formula (6).

$[u_j[i]]=[p_i[\lambda_1]]$, $[v_j[i]]=[q_i[\lambda_2]] \quad (6)$

In step S24, the writing part 24 adds an inner product of the secret text vector $[u_j]$ and the secret text vector $[v_j]$ to a secret text $[a[j]]$ which is the j-th element in the secret text sequence $[a]$ while j is set as each integer equal to or greater than 0 and less than n.

The second embodiment has a feature that a value to be written is expressed with an inner product of two vectors, so that a value to be added to each address of a write destination can be computed from the inner product of the vectors having a size m. Because the inner product can be computed through communication corresponding to multiplication of one time, it is possible to suppress an overall communication amount to $O(n+m\sqrt{n})$.

While the embodiments of the present invention have been described above, a specific configuration is not limited to these embodiments, and it goes without saying that change, or the like, of design is incorporated into the present invention as appropriate within a scope not deviating from the gist of the present invention. Various kinds of processing described in the embodiments are not only executed in a chronological order in accordance with order of description, but may be executed in parallel or individually in accordance with processing performance of an apparatus which executes the processing or as necessary.

[Program, Recording Medium]

In a case where various kinds of processing functions at the respective apparatuses described in the above-described embodiments are implemented with a computer, processing content of functions which should be provided at the respective apparatuses is described with a program. Further, by this program being executed in the computer, various kinds of processing functions at the above-described respective apparatuses are realized on the computer.

The program describing this processing content can be recorded in a computer-readable recording medium. The computer-readable recording medium may be, for example, any medium such as a magnetic recording apparatus, an optical disk, a magnetooptical recording medium and a semiconductor memory.

Further, this program is distributed by, for example, a portable recording medium such as a DVD and a CD-ROM in which the program is recorded, being sold, given, lent, or the like. Still further, it is also possible to employ a configuration where this program is stored in a storage apparatus of a server computer, and the program is distributed by being transferred from the server computer to other computers over a network.

A computer which executes such a program, for example, first, stores the program recorded in the portable recording medium or the program transferred from the server computer in a storage apparatus of the own computer once. Then, upon execution of the processing, this computer reads the program stored in the storage apparatus of the own computer and executes processing in accordance with the read program. Further, as another execution form of this program, the computer may directly read the program from the portable recording medium and execute processing in accordance with the program, and further, every time a program is transferred from the server computer to this computer, the computer may sequentially execute processing in accordance with the received program. Still further, it is also possible to employ a configuration where the above-described processing is executed through so-called ASP (Application Service Provider) service in which processing functions are realized only through an execution instruction and a result acquisition without the program being transferred from the server computer to this computer. Note that the program in the present embodiment includes information which is provided to be used for processing by an electronic computer and which is equivalent to a program (such as data which is not a direct command to the computer but has property of defining processing of a computer).

Further, while, in the present embodiment, the present apparatus is configured by a predetermined program being executed on a computer, at least part of the processing content may be realized with hardware.

What is claimed is:
1. A secure reading apparatus comprising:
an input circuitry configured to receive a secret text sequence and a secret text of a read position as input;
a vector creating circuitry configured to create a secret text vector by using the secret text sequence received by the input circuitry and the secret text of a read position;
a compression computing circuitry configured to repeat generation of a new secret text sequence in which an inner product of a vector expressing the read position and a vector on of the secret text sequence created by the vector generating circuitry until a number of elements of the new secret text sequence becomes one;
a reading circuitry configured to output a secret text sequence having the one element number created by the compression computing circuitry as a secret text at the read position.

2. The secure reading apparatus according to claim 1, wherein n and k are set as integers equal to or greater than 2, and j is set as each integer equal to or greater than 1 and equal to or less than k,
the apparatus input circuitry configured to receive the received secret text sequence received and the secret text of a read position as a secret text sequence $[a_0]=([a_0[0]], [a_0[1]], \ldots, [a_0[n-1]])$ having a size n and a secret text $[x]$ of a read position x as input;
the reading circuitry is configured to output a secret text $[a_0[x]]$ which is an x-th element of the secret text sequence $[a_0]$,
the vector creating circuitry is configured to create a secret text vector $[v_j]$ using the secret text $[x]$ for each integer j,
the compression computing circuitry is configured to create a secret text sequence $[a_j]$ using a secret text sequence $[a_{j-1}]$ and a secret text vector $[v_j]$ for each integer j, and
the reading circuitry is configured to output the secret text sequence having the one element number as a secret text sequence $[a_k]$ having the one element number as the secret text $[a_0[x]]$ which is an x-th element of the secret text sequence $[a_0]$.

3. A non-transitory computer readable medium having a program recorded thereon for causing a computer to function as the secure reading apparatus according to claim 1.

4. The secure reading apparatus according to claim 2, wherein $m_1, m_2, \ldots, m_k$ are set as natural numbers satisfying $n \leq m_1 \times m_2 \times \ldots \times m_k$,
$n_j$ is set as an integer defined with the following formula, and i is set as each integer equal to or greater than 0 and less than $n_j$:

$$n_j = \left\lceil \frac{n}{m_1 \times m_2 \times \ldots \times m_j} \right\rceil,$$

and
the compression computing circuitry creates the secret text sequence $[a_j]$ in which an inner product of a secret text vector $[b_{j,i}]$ created using the secret text sequence $[a_{j-1}]$ for each integer i and the secret text vector $[v_j]$ is set as an i-th element.

5. The secure reading apparatus according to claim 4, wherein the processing circuitry creates the secret text vector $[v_j]$ having a size $m_j$ in which an $x_j$ mod $m_j$-th element is 1 and other elements are 0 while $x_j$ is set as an integer defined with the following formula for each integer j:

$$x_j = \left\lfloor \frac{x}{m_1 \times m_2 \times \ldots \times m_{j-1}} \right\rfloor,$$

and creates the secret text vector $[b_{j,\,i}]$ in which $[b_{j,\,i}] = [a_{j-1}[m_j i+0]], [a_{j-1}[m_j i+1]], \ldots, [a_{j-1}[m_j i+m_j-1]])$, and when $\lambda \geq |a_{j-i}|$, $[a_{j-1}[\lambda]]=0$ for each integer i.

6. A secure reading apparatus comprising:
an input circuitry configured to receive a secret text sequence and a secret text of a read position as input;
a vector creating circuitry configured to create a secret text vector by using the secret text sequence received by the input circuitry and the secret text of a read position;
a compression computing circuitry configured to repeat generation of a new secret text sequence in which an inner product of a vector expressing the read position and a vector of the secret text sequence created by the vector generating circuitry until a number of elements of the new secret text sequence becomes one; and
a reading circuitry configured to output a secret text sequence having the one element number created by the compression computing circuitry as a secret text at the read position,
wherein n and k are set as integers equal to or greater than 2, and j is set as each integer equal to or greater than 1 and equal to or less than k,
the input circuitry configured to receives the received secret text sequence received and the secret text of a read position as a secret text sequence $[a_0]=([a_0[0]], [a_0[1]], \ldots, [a_0[n-1]])$ having a size n and a secret text [x] of a read position x as input;
the reading circuitry is configured to outputs a secret text $[a_0[x]]$ which is an x-th element of the secret text sequence $[a_0]$,
the vector creating circuitry is configured to creates a secret text vector $[v_j]$ using the secret text [x] for each integer j,
the compression computing circuitry is configured to creates a secret text sequence $[a_j]$ using a secret text sequence $[a_{j-1}]$ and a secret text vector $[v_j]$ for each integer j, and
the reading circuitry is configured to output the secret text sequence having the one element number as a secret text sequence $[a_k]$ having the one element number as the secret text $[a_0[x]]$ which is an x-th element of the secret text sequence $[a_0]$,
wherein $m_1, m_2, \ldots, m_k$ are set as natural numbers satisfying $n \leq m_1 \times m_2 \times \ldots \times m_k$,
$n_i$ is set as an integer defined with the following formula, and i is set as each integer equal to or greater than 0 and less than $n_j$:

$$n_j = \left\lceil \frac{n}{m_1 \times m_2 \times \ldots \times m_j} \right\rceil,$$

and the compression computing circuitry creates the secret text sequence $[a_j]$ in which an inner product of a secret text vector $[b_{j,\,i}]$ created using the secret text sequence $[a_{j-1}]$ for each integer i and the secret text vector $[v_j]$ is set as an i-th element, wherein the processing circuitry creates the secret text vector $[v_j]$ having a size $m_j$ in which an $x_j$ mod $m_j$-th element is 1 and other elements are 0 while $x_j$ is set as an integer defined with the following formula for each integer j:

$$x_j = \left\lfloor \frac{x}{m_1 \times m_2 \times \ldots \times m_{j-1}} \right\rfloor,$$

and creates the secret text vector $[b_{j,\,i}]$ in which $[b_{j,\,i}] = ([a_{j-1}[m_j i+0]], [a_{j-1}[m_j i+1]], \ldots, [a_{j-1}[m_j i+m_j-1]])$, and when $\lambda \geq |a_{j-1}|$, $[a_{j-1}[\lambda]]=0$ for each integer i, wherein the secret text sequence $[a_0]$ and the secret text [x] are concealed through secret sharing in which, among shares obtained by dividing a plain text into s pieces, if arbitrary t shares are collected, the plain text can be reconstructed, while any information regarding the plain text cannot be obtained from less than t shares, where t is set as an integer equal to or greater than 1, $s \geq 2t-1$, and k, $m_i$ (i=1, 2, ..., k) are defined with the following formula:

$$k = \left\lfloor \frac{s-1}{t-1} \right\rfloor, m_i = \left\lceil n^{1/k} \right\rceil.$$

7. A secure reading method to be executed by a secure reading apparatus, the secure reading method comprising:
receiving, by an input circuitry, a secret text sequence and a secret text of a read position as input;
creating, by a vector creating circuitry, a secret text vector by using the secret text sequence received by the input circuitry and the secret text of a read position;
repeating, by a compression computing circuitry, generation of a new secret text sequence in which an inner product of a vector expressing the read position and a vector of the secret text sequence created by the vector generating circuitry until a number of elements of the new secret text sequence becomes one;
outputting by a reading circuitry, a secret text sequence having the one element number created by the compression computing circuitry as a secret text at the read position.

8. A secure writing apparatus comprising:
an input circuitry configured to receive a secret text sequence, a secret text of a write address, and a secret text of a value to be written as input;
an address decomposing circuitry configured to create an anonymous vector representing the writing of the value indicated by the secret text of the write address to the write address;
a vector creating circuitry configured to select an element from the secret text vector and create a vector representing the write address and a vector representing the write value;
a writing circuitry configured to add an inner product of a vector expressing the write address and a vector expressing the value to be written to the secret text sequence.

9. The secure writing apparatus according to claim 8, wherein n and m are set as integers equal to or greater than 2, i is set as each integer equal to or greater than 0 and less than m, and j is set as each integer equal to or greater than 0 and less than n, the input circuitry is configured to receive the received secret text sequence received and the secret text of a read position as a secret text sequence $[a]=([a[0]], [a[1]], \ldots, [a[n-1]])$ having a size n, a secret text $[x_i]$ of a write address x and a secret text $[y_i]$ of a value to be written $y_i$ as input;

the address decomposing circuitry is configured to create a secret text vector $[w_i]$ which expresses a write address $x_i$ of the value $y_i$ for each integer i, the vector creating circuitry is configured to select an element from the secret text vector $[w_j]$ and create secret text vectors $[u_j]$ and $[v_j]$ for each integer j, and the writing circuitry is configured to add the inner product of a vector expressing the write address and the vector expressing the value to be written to the secret text sequence by adding an inner product of the secret text vector $[u_j]$ and the secret text vector $[v_j]$ for each integer j to the secret text $[a[j]]$ which is a j-th element of the secret text sequence $[a]$.

10. The secure writing apparatus according to claim 9, wherein the processing circuitry concatenates secret text vectors $[p_i]$ and $[q_i]$ in which, when $n_2\lambda_1+\lambda_2=x_i$, $p_i[\lambda_1] q_i[\lambda_2]$ becomes $[y_i]$ and otherwise becomes zero, to create the secret text vector $[w_i]$ while $n_1$ and $n_2$ are set as natural numbers satisfying $n_1 n_2 \geq n$, and creates the secret text vectors $[u_j]$ and $[v_j]$ as in the following formula:

$$[u_j[i]]=[p_i[\lambda_1]],$$

$$[v_j[i]]=[q_i[\lambda_2]]$$

where i is set as each integer equal to or greater than 0 and less than m, j is set as each integer equal to or greater than 0 and less than n, and $\lambda_1$ and $\lambda_2$ are set as in the following formula:

$$\lambda_1 = \lfloor j/n_2 \rfloor,$$

$$\lambda_2 = j \bmod n_2.$$

11. The secure writing apparatus according to claim 10, wherein the secret text vector $[p_i]$ is a secret text vector having a size $n_1$ in which an element of $$[p_i[\lfloor x_i/n_2 \rfloor]]$$

is one and other elements are zero, and the secret text vector $[q_i]$ is a secret text vector having a size $n_2$ in which an element of $$[q_i[x_i \bmod n_2]]$$

is $[y_i]$, and other elements are zero.

12. A secure writing apparatus comprising:

an input circuitry configured to receive a secret text sequence, a secret text of a write address, and a secret text of a value to be written as input;

an address decomposing circuitry configured to create an anonymous vector representing the writing of the value indicated by the secret text of the write address to the write address;

a vector creating circuitry configured to select an element from the secret text vector and create a vector representing the write address and a vector representing the write value;

a writing circuitry configured to add an inner product of a vector expressing the write address and a vector expressing the value to be written to the secret text sequence;

wherein n and m are set as integers equal to or greater than 2, i is set as each integer equal to or greater than 0 and less than m, and j is set as each integer equal to or greater than 0 and less than n, the input circuitry is configured to receive the received secret text sequence received and the secret text of a read position as a secret text sequence $[a]=([a[0]], [a[1]], \ldots, [a[n-1]])$ having a size n, a secret text $[x_i]$ of a write address $x_i$ and a secret text $[y_i]$ of a value to be written $y_i$ as input;

the address decomposing circuitry is configured to creates a secret text vector $[w_i]$ which expresses a write address $x_i$ of the value $y_i$ for each integer i, the vector creating circuitry is configured to select an element from the secret text vector $[w_j]$ and create secret text vectors $[u_j]$ and $[v_j]$ for each integer j, and the writing circuitry is configured to add the inner product of a vector expressing the write address and the vector expressing the value to be written to the secret text sequence by adding an inner product of the secret text vector $[u_j]$ and the secret text vector $[v_j]$ for each integer j to the secret text $[a[j]]$ which is a j-th element of the secret text sequence $[a]$, wherein the processing circuitry concatenates secret text vectors $[p_i]$ and $[q_i]$ in which, when $n_2\lambda_1+\lambda_2=x_i$, $p_i[\lambda_1] q_i[\lambda_2]$ becomes $[y_i]$ and otherwise becomes zero, to create the secret text vector $[w_i]$ while $n_1$ and $n_2$ are set as natural numbers satisfying $n_1 n_2 \geq n$, and creates the secret text vectors $[u_j]$ and $[v_j]$ as in the following formula:

$$[u_j[i]]=[p_i[\lambda_1]],$$

$$[v_j[i]]=[q_i[\lambda_2]]$$

where i is set as each integer equal to or greater than 0 and less than m, j is set as each integer equal to or greater than 0 and less than n, and $\lambda_1$ and $\lambda_2$ are set as in the following formula:

$$\lambda_1 = \lfloor j/n_2 \rfloor,$$

$$\lambda_2 = j \bmod n_2,$$

wherein the secret text sequence $[a]$, the secret text $[x_i]$ and the secret text $[y_i]$ are concealed through secret sharing in which t is set as an integer equal to or greater than 1, $s \geq 2t-1$, and, among shares obtained by dividing a plain text into s pieces, if arbitrary t shares are collected, the plain text can be obtained, while any information regarding the plain text cannot be obtained from less than t shares, and $n_1$ and $n_2$ are defined with the following formula:

$$n_1, n_2 = \lceil \sqrt{n} \rceil.$$

13. A secure writing method to be executed by a secure writing apparatus comprising:

receiving, by an input circuitry, a secret text sequence, a secret text of a write address, and a secret text of a value to be written as input;

creating, by an address decomposing circuitry, a vector of an anonymous sentence expressing writing of a value indicated by secret text of the writing address to the writing address;

selecting, by a vector creating circuitry, an element from the secret text vector, and creating, by the vector creating circuitry, a vector expressing the writing address and a vector expressing the writing value; and adding, by a writing circuitry, an inner product of a vector expressing the write address and a vector expressing the value to be written to an element at the write address of the secret text sequence.

\* \* \* \* \*

UNITED STATES PATENT AND TRADEMARK OFFICE
CERTIFICATE OF CORRECTION

PATENT NO. : 11,514,192 B2
APPLICATION NO. : 16/648436
DATED : November 29, 2022
INVENTOR(S) : Koki Hamada It is certified that error appears in the above-identified patent and that said Letters Patent is hereby corrected as shown below:

In the Claims

In Claim 4, Column 8, Line 46, please change "satisfying $n \leq m_i \times m_2 \times ... \times m_k$," to --satisfying $n \leq m_1 \times m_2 \times ... \times m_k$,--.

In Claim 6, Column 9, Line 31, please change "the input circuitry configured to receives the received" to --the input circuitry configured to receive the received--.

In Claim 6, Column 9, Line 36, please change "the reading circuitry is configured to outputs a secret text" to --the reading circuitry is configured to output a secret text--.

In Claim 6, Column 9, Line 39, please change "the vector creating circuitry is configured to creates a" to --the vector creating circuitry is configured to create a--.

In Claim 6, Column 9, Line 43, please change "creates a secret text sequence [$a_j$] using a secret text" to --create a secret text sequence [$a_j$] using a secret text--.

In Claim 9, Column 11, Line 5, please change "of a write address x and a secret text [$y_i$] of a value to" to --of a write address $x_i$ and a secret text [$y_i$] of a value to--.

In Claim 12, Column 12, Line 54, please change "$n_1, n_2 = [n]$." to --$n_1, n_2 = \lceil \sqrt{n} \rceil$--.

Signed and Sealed this
Eleventh Day of July, 2023

Katherine Kelly Vidal
*Director of the United States Patent and Trademark Office*